(12) United States Patent  (10) Patent No.: US 8,567,448 B2
Stringfellow et al.  (45) Date of Patent: *Oct. 29, 2013

(54) METHODS AND SYSTEMS FOR IN SITU PIPE LINING

(75) Inventors: William D. Stringfellow, Houston, TX (US); Stephen C. Catha, Houston, TX (US); Kenneth R. Charboneau, Slidell, LA (US)

(73) Assignee: Smart Pipe Company, Inc., Katy, TX (US)

( * ) Notice: Subject to any disclaimer, the term of this patent is extended or adjusted under 35 U.S.C. 154(b) by 898 days.

This patent is subject to a terminal disclaimer.

(21) Appl. No.: 12/317,376

(22) Filed: Dec. 22, 2008

(65) Prior Publication Data

US 2009/0205733 A1  Aug. 20, 2009

Related U.S. Application Data

(60) Provisional application No. 61/009,110, filed on Dec. 26, 2007.

(51) Int. Cl.
*F16L 55/16* (2006.01)

(52) U.S. Cl.
USPC ............. 138/98; 135/104; 135/112; 135/120; 135/125; 135/130; 405/150.1; 405/184.2

(58) Field of Classification Search
USPC ......... 138/98, 130, 125, 112, 104; 405/150.4, 405/184.2
See application file for complete search history.

(56) References Cited

U.S. PATENT DOCUMENTS

| 1,722,764 | A | | 7/1929 | Rasch | 442/240 |
| 2,424,315 | A | | 7/1947 | Hyatt et al. | 138/128 |
| 2,502,638 | A | | 4/1950 | Becht | |
| 3,099,190 | A | | 7/1963 | Allen, Jr. et al. | 93/80 |
| 3,177,902 | A | * | 4/1965 | Rubenstein | 138/176 |
| 3,253,618 | A | | 5/1966 | Cook | 138/125 |
| 3,500,869 | A | | 3/1970 | Skoggard et al. | 138/130 |
| 3,599,233 | A | * | 8/1971 | Meyer | 703/9 |
| 3,616,072 | A | | 10/1971 | Bostrom | 156/468 |
| 3,779,308 | A | | 12/1973 | Buhrmann et al. | 165/51 |
| 3,799,825 | A | | 3/1974 | Champleboux et al. | 156/144 |
| 3,823,590 | A | | 7/1974 | Lang | 72/66 |
| 3,905,398 | A | | 9/1975 | Johansen et al. | 138/124 |
| 4,009,063 | A | | 2/1977 | Wood | 156/71 |
| 4,029,428 | A | | 6/1977 | Levens | 408/127 |

(Continued)

FOREIGN PATENT DOCUMENTS

EP  0 231 154  8/1987

*Primary Examiner* — James Hook
(74) *Attorney, Agent, or Firm* — Guy McClung

(57) ABSTRACT

A liner or core pipe which is suitable for insertion into a host pipe, the core pipe including, in certain aspects, a pipe made of temperature-resistant corrosion-resistant material and having an outer surface, an inner surface, a first end and a second end and a flow channel therethrough from the first end to the second end; first and second strengthening wraps around the pipe; a plurality of spaced-apart pulling tapes on the pipe; the pipe deformable to facilitate insertion into a host pipe, and a protective outer wrap on the pipe. This abstract is provided to comply with the rules requiring an abstract which will allow a searcher or other reader to quickly ascertain the subject matter of the technical disclosure and is submitted with the understanding that it will not be used to interpret or limit the scope or meaning of the claims, 37 C.F.R. 1.72(b).

32 Claims, 9 Drawing Sheets

(56) References Cited

U.S. PATENT DOCUMENTS

| | | | |
|---|---|---|---|
| 4,120,324 A | 10/1978 | Pahl | 138/137 |
| 4,123,928 A | 11/1978 | Ferrentino | 72/66 |
| 4,135,958 A | 1/1979 | Wood | 156/199 |
| 4,142,352 A | 3/1979 | Greczin | 57/15 |
| 4,207,130 A | 6/1980 | Barber | 156/244.13 |
| 4,351,349 A | 9/1982 | Minotti | 137/15 |
| 4,366,012 A | 12/1982 | Wood | 155/93 |
| 4,384,595 A | 5/1983 | Washkewicz et al. | 138/127 |
| 4,390,574 A | 6/1983 | Wood | 428/36 |
| 4,446,181 A | 5/1984 | Wood | 428/36.1 |
| 4,478,661 A | 10/1984 | Lewis | 156/92 |
| 4,495,018 A | 1/1985 | Vohrer | 156/187 |
| 4,576,205 A | 3/1986 | Morinaga et al. | 138/98 |
| 4,622,196 A | 11/1986 | Wood | 264/229 |
| 4,756,339 A | 7/1988 | Buluschek | 138/115 |
| 4,777,984 A | 10/1988 | Storah | 138/98 |
| 4,836,715 A | 6/1989 | Wood | 405/150.1 |
| 4,838,477 A | 6/1989 | Roach et al. | 228/222 |
| 4,851,274 A | 7/1989 | D'Elia | 428/113 |
| 4,976,290 A | 12/1990 | Gelin et al. | 138/141 |
| 4,985,196 A * | 1/1991 | LeDoux et al. | 264/516 |
| 5,010,440 A | 4/1991 | Endo | 361/215 |
| 5,035,539 A | 7/1991 | Kawafuji et al. | 405/184.2 |
| 5,049,006 A | 9/1991 | Payne | 405/270 |
| 5,072,622 A | 12/1991 | Roach et al. | 73/40.5 R |
| 5,077,107 A | 12/1991 | Kaneda et al. | 146/36.1 |
| 5,152,323 A * | 10/1992 | Shotts et al. | 138/151 |
| 5,186,987 A | 2/1993 | Imoto et al. | 428/34.5 |
| 5,225,021 A | 7/1993 | Lona | 156/190 |
| 5,271,433 A | 12/1993 | Schwert et al. | 138/98 |
| 5,395,472 A | 3/1995 | Mandich | 145/287 |
| 5,397,513 A * | 3/1995 | Steketee, Jr. | 264/36.17 |
| 5,399,854 A | 3/1995 | Dunphy et al. | 250/227.17 |
| 5,497,809 A | 3/1996 | Wolf | 138/113 |
| 5,501,248 A | 3/1996 | Kiest, Jr. | 138/98 |
| 5,503,695 A * | 4/1996 | Imoto et al. | 156/71 |
| 5,546,992 A | 8/1996 | Chick et al. | 138/98 |
| 5,551,484 A | 9/1996 | Charboneau | 138/104 |
| 5,632,952 A | 5/1997 | Mandich | 264/516 |
| 5,634,743 A | 6/1997 | Chandler | 405/150.1 |
| 5,670,880 A | 9/1997 | Bloss et al. | 336/132 |
| 5,680,885 A | 10/1997 | Catallo | 138/98 |
| 5,712,010 A | 1/1998 | Russek et al. | 428/36.3 |
| 5,759,968 A | 6/1998 | Furutani et al. | 340/854.8 |
| 5,762,450 A | 6/1998 | Schmager | 405/154 |
| 5,778,938 A * | 7/1998 | Chick et al. | 138/98 |
| 5,865,216 A | 2/1999 | Youngs | 138/135 |
| 5,868,169 A | 2/1999 | Catallo | 138/98 |
| 5,921,285 A | 7/1999 | Quigley et al. | 138/125 |
| 5,931,199 A | 8/1999 | Kittson et al. | 138/98 |
| 5,933,945 A | 8/1999 | Thomeer et al. | 29/825 |
| 5,934,332 A * | 8/1999 | Rodriguez et al. | 138/98 |
| 6,004,639 A | 12/1999 | Quigley et al. | 428/36.3 |
| 6,058,978 A | 5/2000 | Paletta et al. | 138/98 |
| 6,098,665 A | 8/2000 | Grace | 138/98 |
| 6,117,507 A * | 9/2000 | Smith | 428/36.9 |
| 6,123,110 A | 9/2000 | Smith et al. | 138/98 |
| 6,170,531 B1 | 1/2001 | Jung et al. | 138/98 |
| 6,220,079 B1 | 4/2001 | Taylor et al. | 73/37 |
| 6,302,152 B1 | 10/2001 | Mulligan | 138/125 |
| 6,311,730 B2 * | 11/2001 | Penza | 138/98 |
| 6,357,485 B2 | 3/2002 | Quigley et al. | 138/125 |
| 6,446,672 B1 | 9/2002 | Kalman et al. | 138/127 |
| 6,455,115 B1 | 9/2002 | DeMeyer | 426/36.2 |
| 6,572,306 B2 | 6/2003 | Prusak | 405/183.5 |
| 6,601,600 B1 | 8/2003 | Taylor | 137/15.04 |
| 6,619,886 B1 | 9/2003 | Harrington | 405/184.2 |
| 6,627,281 B2 | 9/2003 | DeMeyer | 428/36.1 |
| 6,634,388 B1 | 10/2003 | Taylor et al. | 138/114 |
| 6,663,808 B2 | 12/2003 | DeMeyer | 264/171.26 |
| 6,691,741 B2 | 2/2004 | Manners | 138/98 |
| 6,708,729 B1 | 3/2004 | Smith | 138/98 |
| 6,769,454 B2 | 8/2004 | Fraser et al. | 138/127 |
| 6,782,932 B1 | 8/2004 | Reynolds, Jr. et al. | 156/351 |
| 6,785,004 B2 | 8/2004 | Kersey et al. | 356/478 |
| 6,824,689 B2 | 11/2004 | Wang et al. | 210/660 |
| 6,935,376 B1 * | 8/2005 | Taylor et al. | 138/98 |
| 6,945,279 B2 | 9/2005 | Baba et al. | 138/137 |
| 6,960,313 B2 | 11/2005 | Waring et al. | 264/36.17 |
| 7,025,580 B2 | 4/2006 | Heagy et al. | 425/11 |
| 7,216,674 B2 | 5/2007 | Manners | 138/98 |
| 7,258,141 B2 * | 8/2007 | Catha et al. | 138/98 |
| 7,824,595 B2 | 11/2010 | Appleby et al. | 264/316 |
| 2002/0124898 A1 | 9/2002 | Renaud et al. | 138/98 |
| 2002/0189749 A1 | 12/2002 | Shieh | 156/172 |
| 2003/0051795 A1 | 3/2003 | Burgess | 156/169 |
| 2003/0206989 A1 | 11/2003 | DeMeyer | 425/392 |
| 2004/0025951 A1 | 2/2004 | Baron et al. | 138/98 |
| 2004/0144440 A1 | 7/2004 | Lundberg et al. | 138/130 |
| 2006/0124188 A1 * | 6/2006 | Catha et al. | 138/98 |
| 2008/0281534 A1 * | 11/2008 | Hurley | 702/47 |
| 2009/0294567 A1 | 12/2009 | Witmer et al. | 242/419 |

* cited by examiner

METHODS AND SYSTEMS FOR IN SITU PIPE LINING

CROSS REFERENCE TO RELATED APPLICATION

The present invention and application, under the Patent Laws, claim the benefit of priority from pending U.S. Application Ser. No. 61/009,110 filed 26 Dec. 2007 and said Application is fully incorporated herein for all purposes.

BACKGROUND OF THE INVENTION

1. Field Of The Invention

The present invention in certain aspects, is directed to systems and methods for making pipe liners, to lined pipe and pipelines, to high-pressure pipe liners, to pipelines with liners and fiber optic sensors, to methods for lining pipe and pipe liners, and, in certain particular aspects, to continuous reinforced thermoplastic pipe liner intended for use as a stand alone pipe liner in the restoration of degraded pipelines.

2. Description of Related Art

It is known to use composites to line installed piping systems without the time, effort, and expense of digging up the pipe. Certain prior "in situ" systems work for lining standard water or sewer lines, but when it comes to replacing high-pressure, gas, oil and industrial piping systems in more demanding, crowded or corrosive environments, often the pipe is dug up for lining.

A wide variety of systems and methods are known for lining pipe; including, and not by way of limitation, those disclosed in U.S. Pat. Nos. 4,064,211; 6,708,729; 4,863,365; 4,985,196; 4,998,871; 6,058,978; 3,769,127; 4,053,343; 5,755,266; 5,828,003; 6,065,540; 5,762,450; 7,258,141; 5,551,484; 5,395,472; 6,769,454; 6,601,600; and 6,220,079, all fully incorporated herein for all purposes. Pending patent applications co-owned with the present invention—U.S. Ser. Nos. 11/172,132 filed Jul. 1, 2005 and Ser. No. 11/033,962 filed 12 Jan. 2005—are incorporated fully herein for all purposes.

BRIEF SUMMARY OF THE INVENTION

The present invention discloses, in certain aspects, new in situ pipe relining systems and methods that integrate off-the-shelf extruded polyethylene, layers of carbon and fiber tape, and an on-site manufacturing and installation system designed specifically to replace various high-performance, high-pressure piping systems. Certain disclosures of this application are in the article "In situ manufacturing: Pipe relining in demanding corrosive environments," High Performance Composites, Vol. 15, No. 1, January 2007, incorporated fully herein for all purposes.

In certain aspects, the present invention discloses a portable factory which continuously manufactures and inserts composite stand-alone liners (or "core pipe") into damaged underground pipelines restoring their designed capabilities without excavation and pipe replacement. In certain aspects, the systems according to the present invention have a staged deformation device which temporarily collapses a new liner, e.g., into a restorable shape, e.g. a "C" shape, reducing its diameter, e.g. by about twenty to fifty percent and, in certain aspects, by about forty percent, to ease installation as it enters existing pipe. In one aspect, the present invention discloses methods for making a core pipe (also called a "liner") suitable for insertion into a host pipe, the methods including: welding together a plurality of pieces to form a pipe, a pipe made of temperature-resistant corrosion-resistant material, the pipe having an outer surface, an inner surface, a first end and a second end and a flow channel therethrough from the first end to the second end; wrapping the pipe with a first strengthening wrap; wrapping the pipe with a second strengthening wrap; securing a plurality of pulling tapes on the pipe; deforming the pipe to facilitate insertion thereof into a host pipe; wrapping the pipe following deforming with a plurality of tapes to maintain the pipe in a deformed shape during insertion into a host pipe; and wrapping the pipe with a protective outer wrap to protect the pie during installation in a host pipe In one particular aspect, the deformed shaped liner, after deformation, is wrapped with a holder, e.g. tape, e.g., in one aspect, Mylar tape which holds the liner in the deformed configuration while it is installed in a pipe.

In another particular aspect, the deformed liner is wrapped with a thin sleeve, e.g. with a thin plastic film, e.g., in one aspect, a film of HDPE (high density polyethylene) (in one aspect, with partially cured relatively sticky butyl rubber adhesive) to maintain the liner components in position and to protect the liner during installation.

In one aspect, the present invention discloses core pipe which is suitable for insertion into a host pipe, the core pipe including: a pipe made of temperature-resistant corrosion-resistant material, the pipe having an outer surface, an inner surface, a first end and a second end and a flow channel therethrough from the first end to the second end; a first strengthening wrap around the pipe; a second strengthening wrap around the pipe; a plurality of spaced-apart pulling tapes positioned longitudinally on the pipe; the pipe deformable to facilitate insertion into a host pipe; and a protective outer wrap on the pipe for protection during insertion into the host pipe U.S. Pat. No. 7,374,127, co-owned with the present invention, discloses apparatus for wrapping material on pipe. and is incorporated fully herein for all purposes.

The present invention discloses, in certain aspects, methods for pulling a core pie into a host pipe, the methods including: inserting a pulling rope through the host pipe so that the pulling rope extends through the host pipe, connecting the pulling rope to pulling tapes of a core pipe, the core pipe comprising a pipe made of temperature-resistant corrosion-resistant material, the pipe having an outer surface, an inner surface, a first end and a second end and a flow channel therethrough from the first end to the second end, a first strengthening wrap around the pipe, a second strengthening wrap around the pipe, a plurality of spaced-apart pulling tapes positioned longitudinally on the pipe, the pipe deformable to facilitate insertion into a host pipe, and a protective outer wrap on the pipe for protection during insertion into the host pipe, pulling the pulling rope with pulling apparatus to pull the core pipe into the host pipe until an end of the core pipe reaches an end of the host pipe and core pipe is along the entire length of the host pipe. Accordingly, the present invention includes features and advantages which are believed to enable it to advance pipe lining technology. Characteristics and advantages of the present invention described above and additional features and benefits will be readily apparent to those skilled in the art upon consideration of the following detailed description of preferred embodiments and referring to the accompanying drawings.

Certain embodiments of this invention are not limited to any particular individual feature disclosed here, but include combinations of them distinguished from the prior art in their structures, functions, and/or results achieved. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

What follows are some of, but not all, the objects of this invention. In addition to the specific objects stated below for at least certain preferred embodiments of the invention, other objects and purposes will be readily apparent to one of skill in this art who has the benefit of this invention's teachings and disclosures. It is, therefore, an object of at least certain preferred embodiments of the present invention to provide the embodiments and aspects listed above and:

New, useful, unique, efficient, nonobvious systems and methods for lining pipe and pipelines;

Such systems including a portable factory for making and/or lining pipe;

Such systems and methods including wrapping a deformed liner with tape prior to insertion of the liner in a pipe; and Such systems and methods including wrapping a deformed liner with a sleeve; in one aspect, a tape of HDPE (in one aspect with partially cured butyl rubber) prior to insertion of the liner in a pipe.

The present invention recognizes and addresses the problems and needs in this area and provides a solution to those problems and a satisfactory meeting of those needs in its various possible embodiments and equivalents thereof. To one of skill in this art who has the benefits of this invention's realizations, teachings, disclosures, and suggestions, various purposes and advantages will be appreciated from the following description of certain preferred embodiments, given for the purpose of disclosure, when taken in conjunction with the accompanying drawings. The detail in these descriptions is not intended to thwart this patent's object to claim this invention no matter how others may later attempt to disguise it by variations in form, changes, or additions of further improvements.

The Abstract that is part hereof is to enable the U.S. Patent and Trademark Office and the public generally, and scientists, engineers, researchers, and practitioners in the art who are not familiar with patent terms or legal terms of phraseology to determine quickly from a cursory inspection or review the nature and general area of the disclosure of this invention. The Abstract is neither intended to define the invention; which is done by the claims, nor is it intended to be limiting of the scope of the invention or of the claims in any way.

It will be understood that the various embodiments of the present invention may include one, some, or all of the disclosed, described, and/or enumerated improvements and/or technical advantages and/or elements in claims to this invention.

Certain aspects, certain embodiments, and certain preferable features of the invention are set out herein. Any combination of aspects or features shown in any aspect or embodiment can be used except where such aspects or features are mutually exclusive.

BRIEF DESCRIPTION OF THE SEVERAL VIEWS OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

Figure 1:
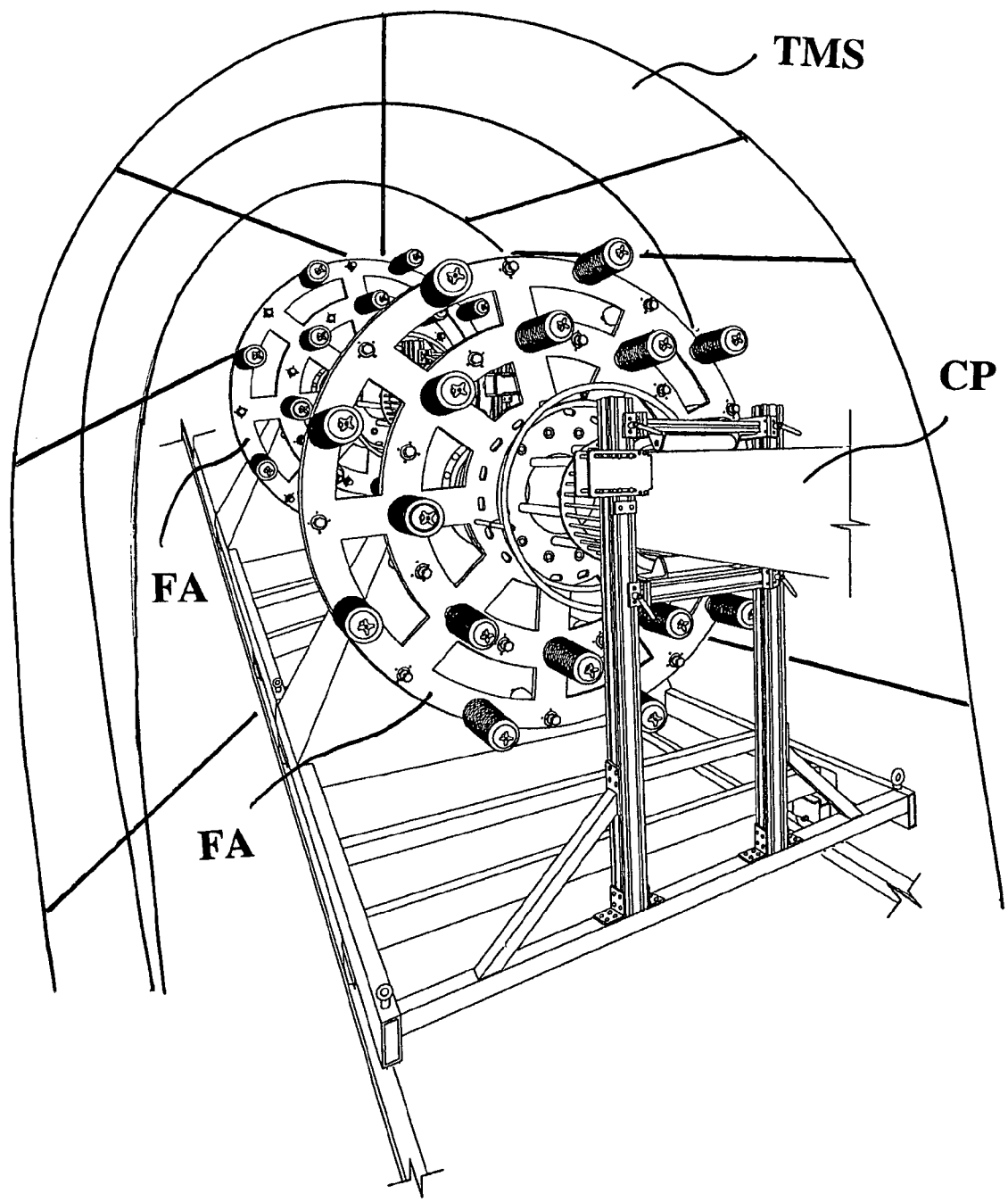
FIG. 1 is a perspective view of part of a system according to the present invention.

Presently preferred embodiments of the invention are shown in the above-identified figures and described in detail below. Various aspects and features of embodiments of the invention are described below and some are set out in the dependent claims. Any combination of aspects and/or features described below or shown in the dependent claims can be used except where such aspects and/or features are mutually exclusive. It should be understood that the appended drawings and description herein are of preferred embodiments and are not intended to limit the invention or the appended claims. On the contrary, the intention is to cover all modifications, equivalents and alternatives falling within the spirit and scope of the invention as defined by the appended claims. In showing and describing the preferred embodiments, like or identical reference numerals are used to identify common or similar elements. The figures are not necessarily to scale and certain features and certain views of the figures may be shown exaggerated in scale or in schematic in the interest of clarity and conciseness.

As used herein and throughout all the various portions (and headings) of this patent, the terms "invention", "present invention" and variations thereof mean one or more embodiment, and are not intended to mean the claimed invention of any particular appended claim(s) or all of the appended claims. Accordingly, the subject or topic of each such reference is not automatically or necessarily part of, or required by, any particular claim(s) merely because of such reference. So long as they are not mutually exclusive or contradictory any aspect or feature or combination of aspects or features of any embodiment disclosed herein may be used in any other embodiment disclosed herein.

DETAILED DESCRIPTION OF THE INVENTION

In one embodiment, the construction and installation of a high-pressure liner according to the present invention are done on site nearly simultaneously; e.g. in a temporary manufacturing shelter TMS (see FIG. 1) which protects equipment used in methods according to the present invention as well as personnel during manufacturing and installation. One end of a host pipe (the pipe to be lined and/or replaced) is exposed, and, if necessary, a long, temporary manufacturing structure, e.g., a tent or portable enclosure (e.g. shelter TMS), is erected to protect material, control systems and workers from the elements. At the terminus of the host pipe is equipment and computer control systems designed primarily to help pull and guide the new pipe through the host pipe.

Figure 2:
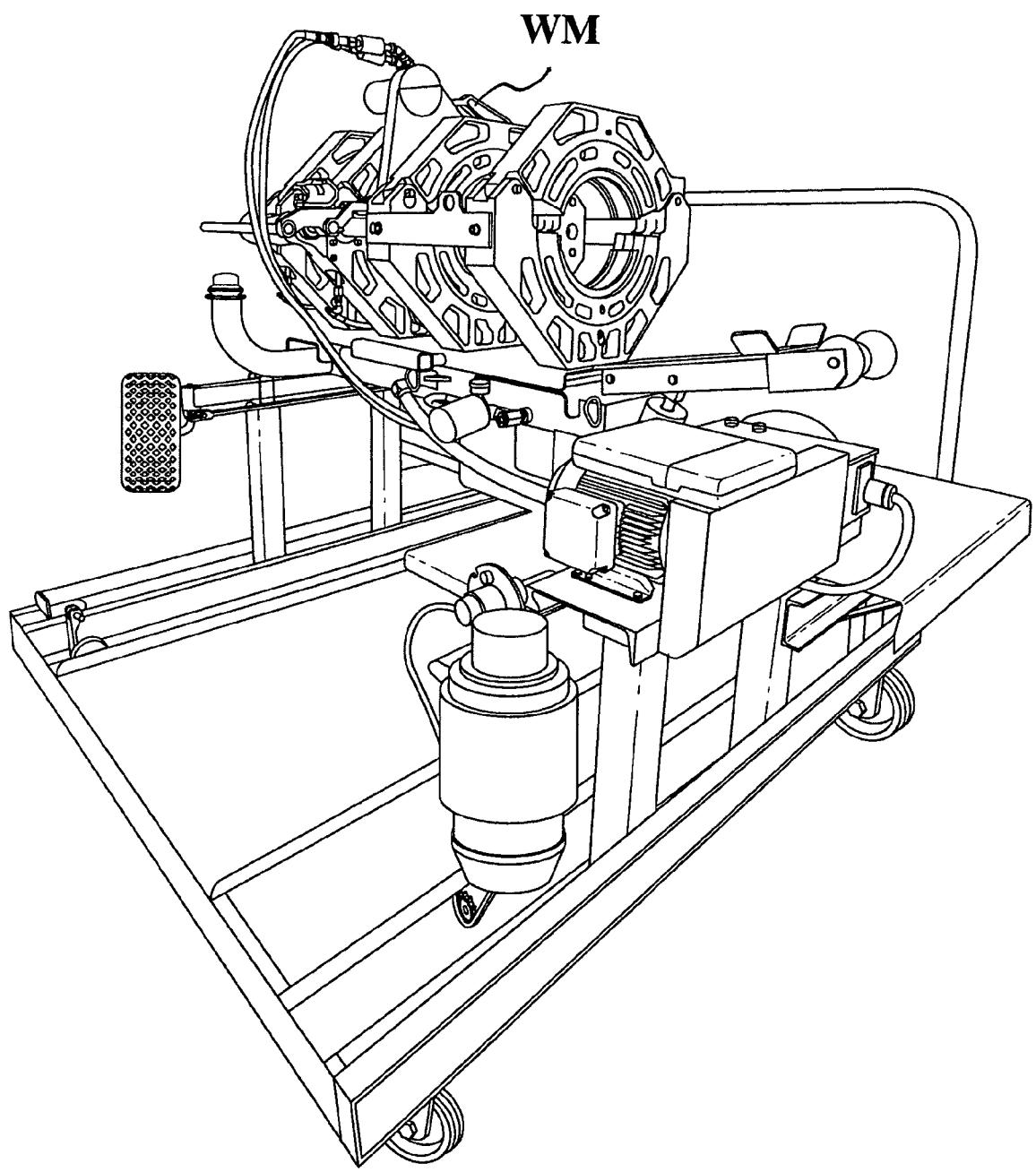
FIG. 2 is a perspective view of a fusion welding machine of the system of FIG. 1.
Figure 10:
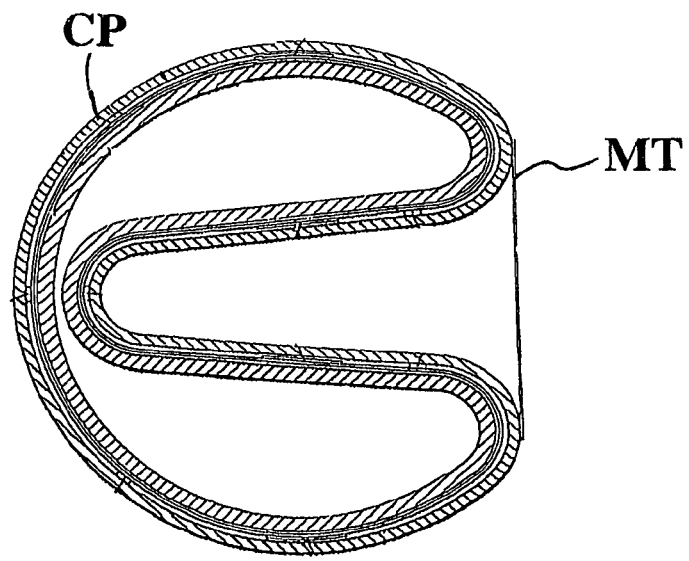
FIG. 10 is a schematic view of a pipe according to the present invention.

The manufacturing tent, in certain aspects, up to 500 feet long or more, is the site of an intricate assembly line that connects, wraps, and prepares the new pipe for insertion into the host pipe. According to the present invention, pipe coatings and wrap materials can vary. In one particular aspect of the present invention, a pipeline is manufactured in the following order, working from the inside out:
1. HDPE core pipe, butt fusion welded (using a machine as in FIG. 2), is made
2. High Strength braided fabric sleeve, Wrap 1, is wrapped (see FIG. 3) on the pipe
3. High Strength braided fabric sleeve, Wrap 2, is wrapped (see FIG. 4) on the pipe
4. Carbon fiber pulling tapes are applied to the wrapped pipe (see FIG. 5)
5. Fiber optic sensors are secured to the pipe (Step 5 optional)
6. High Strength fiber tow, Wrap 3, is wrapped on the pipe (see FIG. 6) (Step 6 optional)
7. High Strength fiber tow, Wrap 4, is wrapped on the pipe (see FIG. 6) (Step 7 optional)
8. Pipe deformed for fit in host pipe (see FIGS. 7, 10)
9. Mylar tape wrapped on the pipe to maintain deformation during insertion (see FIG. 8)
10. HDPE film protective outer wrap wrapped on pipe In one aspect, a 40- to 50-foot section of HDPE pipe is used as the core pipe, e.g. standard extruded PE 100 pipe (or other material—PEX, PA-11 or PVDF) if temperature or corrosion factors dictate it. Pipe diameter depends on the diameter of the pipe being replaced (the host pipe), and, in certain aspect, ranges from 6 inches up to 16 inches (and in one aspect, is about 12 inches). Wall thickness of the new pipe is as desired and in certain aspects depends on the application and environment (e.g., but not limited to, about 4 mm and up to 7 mm). The total quantity of HDPE core pipe required for a given project depends on the total length of the host pipe which can range from a few hundred feet up to 10 miles or more (e.g., but not limited to, about 2 miles to about 2.5 miles).

HDPE core pipe sections are brought together in the assembly line and butt fusion welded end-to-end, e.g. using a fusion welding machine WM (FIG. 2), e.g. a commercially available TracStar fusion machine provided by McElroy Mfg. Inc. (Tulsa, Okla.). This is followed by welding inspection to verify that a leak-proof seal exists between core pipe components. Sleeve material, e.g. in one aspect, SPECTRA (TRADEMARK) material braided sleeve is used for Wraps 1 and 2. Two layers of a high strength braided fabric material is co-helical wrapped around the pipe using two concentric tape winders and controlled by a control systems, e.g., a system with one or more computers and/or PLC's. Any desirable wind angle may be used for Wraps 1 and 2; and, in one particular aspect, positive and negative wind angles (in one aspect, plus-or-minus 65 degrees) are used.

Figure 3:
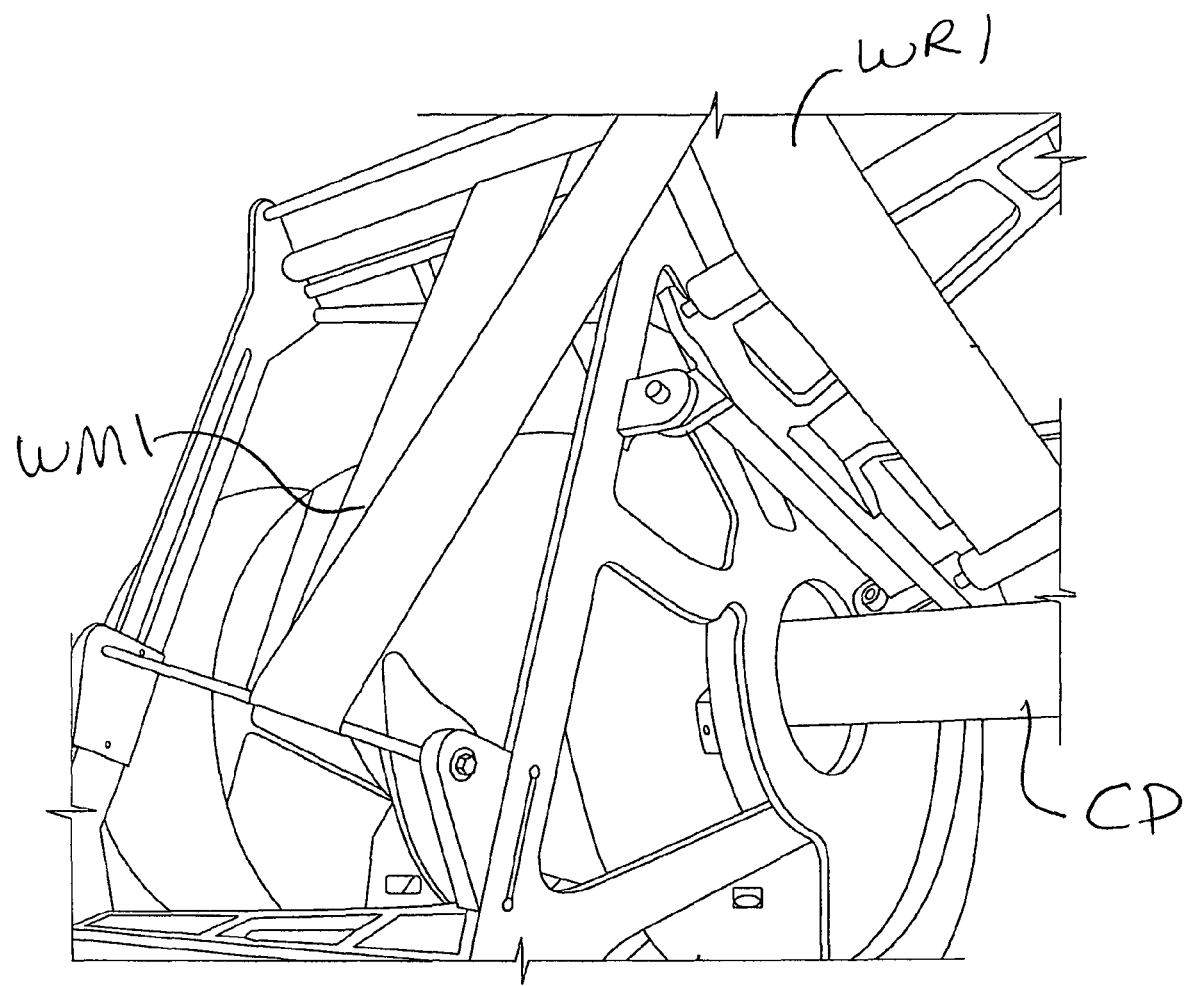
FIG. 3 is a perspective view of a wrapping step in a method according to the present invention using the system of FIG. 1.
Figure 4:
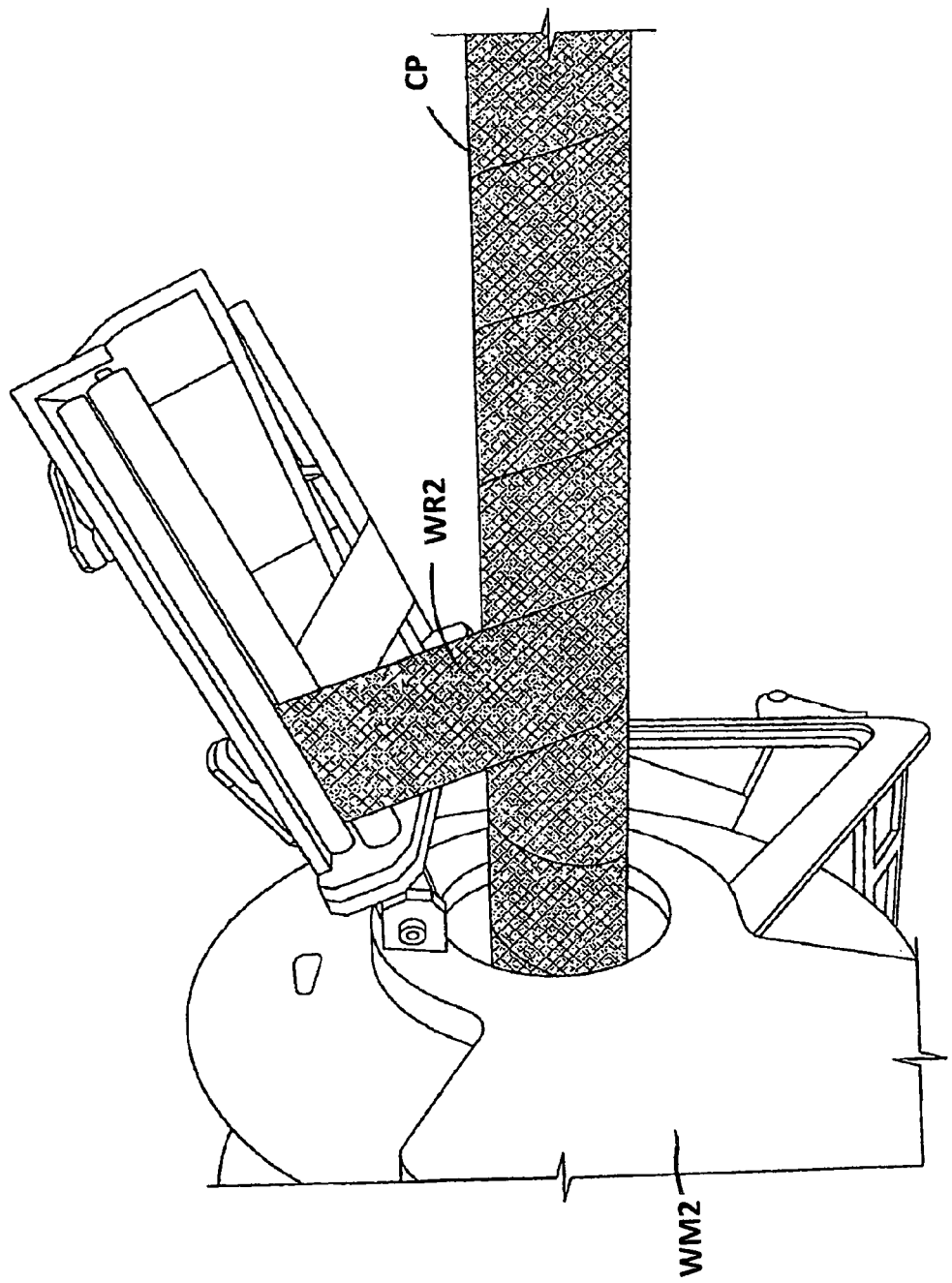
FIG. 4 is a perspective view of a wrapping step in a method according to the present invention using the system of FIG. 1.

FIG. 3 illustrates the wrapping of Wrap 1 material WR1 onto a new core pipe CP by a wrap machine WM 1 (e.g., but not limited to, about 6 inches wide). FIG. 4 illustrates the wrapping of Wrap 2 material WR2 onto the core pipe CP by a wrap machine WM2. In one aspect Wrap 1 and Wrap 2 are wound at winding angles (positive and negative) of about 65 degrees.

SPECTRA (TRADEMARK) material is made from ultra-high molecular weight polyethylene run through a patented gel-spinning process, supplied by Honeywell Advanced Fibers and Composites (Colonial Heights, Va.). Hexcel (Dublin, Calif.) provides a commercially available basket-woven fabric made of this material. In one aspect, as used in methods according to the present invention, a coating is added to the woven; e.g. the commercially available EVA coating applied by JHRG LLC (Spring Hope, N.C.), to the fabric to prevent unraveling and slipping, before it's finally wound around the pipe.

The SPECTRA (TRADEMARK) material has a high strength-to-weight ratio; is reported to be pound-for-pound ten times stronger than steel; has an ability to resist chemicals, water, and light; and an ability to provide the structural and pressure support needed, without adding a great deal of weight. In one aspect SPECTRA (TRADEMARK) material is used in its dry form only without the addition of a resin which does not increase the stiffness of the pipe. Any other suitable wrap material can be used for Wraps 1 and 2; e.g. SPECTRA (TRADEMARK) material hybridized with materials that do not creep or a triaxial braided wrap material with unidirectional S-Glass and hot melt thermoplastic fibers, e.g. as commercially available from A & P Technologies.

Figure 5:
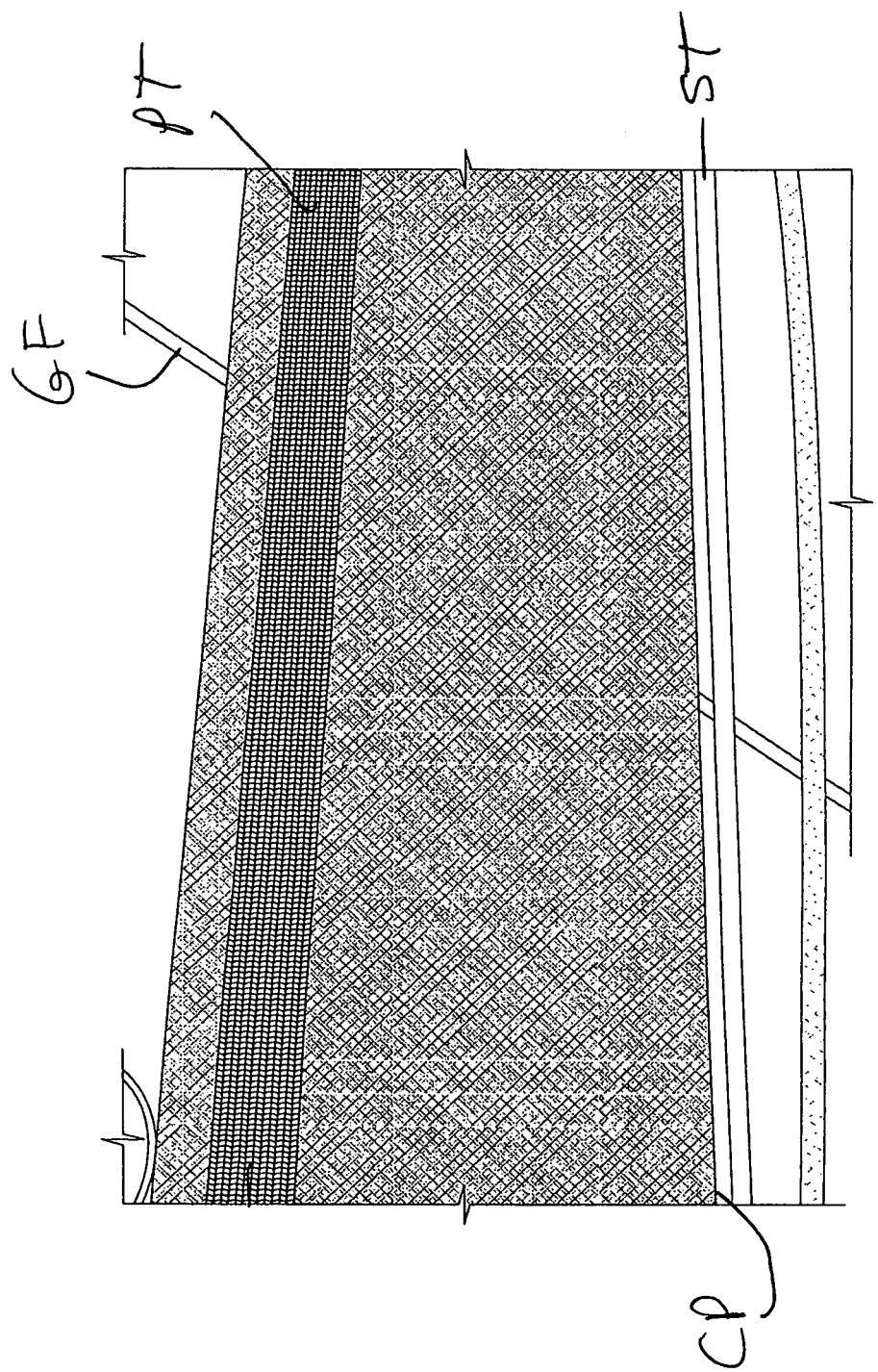
FIG. 5 is a perspective view of a step in a method according to the present invention using the system of FIG. 1.
Figure 6:
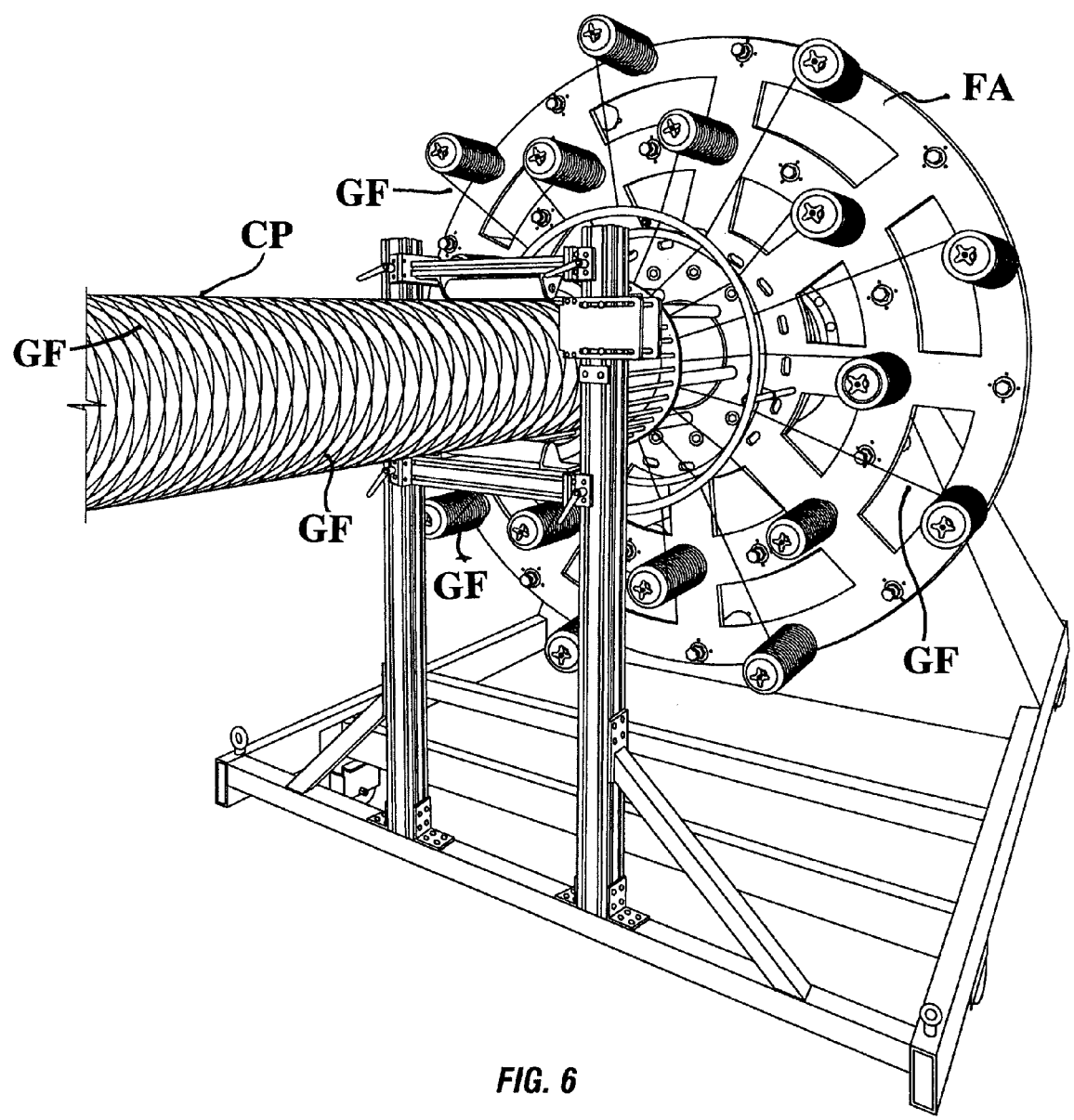
FIG. 6 is a perspective view of a step in a method according to the present invention using the system of FIG. 1.

As shown in step 4, FIG. 5, pulling tapes PT are applied and running the length of the pipe CP; e.g., multiple tapes, e.g. four continuous carbon fiber pulling tapes. Spaced at equidistant intervals around the perimeter of the pipe, in one aspect, each tape is a triaxial lay-flat sleeve 1 to 3 inches in width that runs the length of the pipe on a the degree axis. For example, a 50K, 34-550 carbon fiber braid tape, brand-named TRIMAX (TRADEMARK), provided by A&P Technology Inc. (Cincinnati, Ohio) with a thermoplastic hot-melt coating may be used. As the tape is applied, the material is ironed (flattened) in place and the heated thermoplastic wets out the fibers. Alternatively, the tape may be made of VECTRAN (TRADEMARK) fibers braided together.

Figure 9:
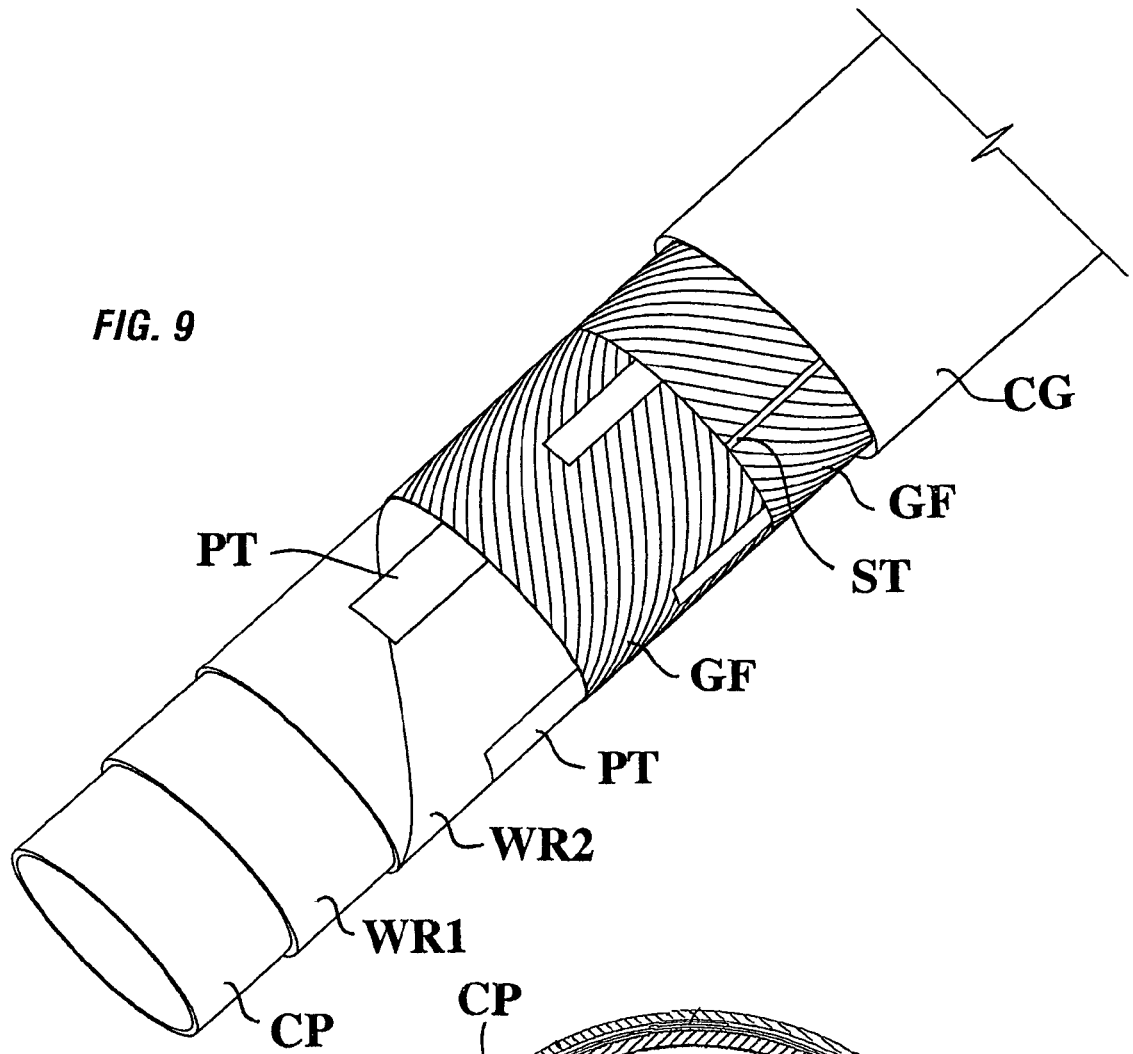
FIG. 9 is a schematic view, partially cutaway, of pipe liner made with a system according to the present invention.

On the same layer as the carbon fiber pulling tape, fiber optic sensors are, optionally, applied along the length of the core pipe as strips ST (see FIG. 9) of encapsulated fiber optic sensors, optionally running the entire length of the liner (see, e.g., FIGS. 5, 9). It is these sensors that provide signals indicative of applied tension which are processed by the control system to provide monitoring of the pipe as it is made. The fiber optic sensors also function during and after core pipe installation in a host pipe: During liner pulling (installation of core pipe) these sensors provide data on pipe tension and integrate with the pipe-pulling system, controlled by the control system, to adjust on-the-fly to increased and decreased tension. After installation, the sensors can (within a limited distance; e.g. in one aspect, within 3.1 feet) detect leaks, sense displacement and/or report temperature along the pipe, all of which help a pipeline manager monitor pipe integrity and anticipate potential failures.

In one aspect, glass fiber tow GF is used in wraps 3 and 4 (e.g., E-glass fiber tows commercially available from Fiber Glass Industries Inc. (Amsterdam, N.Y.); or, e.g. 3000 denier polyester fiber. Next in the assembly line the tows are wound by a fiber applying machine FA on the core pipe CP (see FIG. 6); e.g., wound at alternating angles (plus-minus 65 degrees); in one aspect, with up to 36 tows in each layer. These tows GF secure the carbon fiber tape and the fiber optic strips. In one aspect, these tows GF can provide pressure support, In another aspect, these tows GF are designed to provide only minimal pressure support for the pipe CP itself. These tows GF are, in one aspect, commercially available standard E-glass. Optionally, there are no tows, but there are tapes of HPPE/rubber coated applied by a machine like the machine FA modified if needed due to differences in the tapes.

Figure 7:
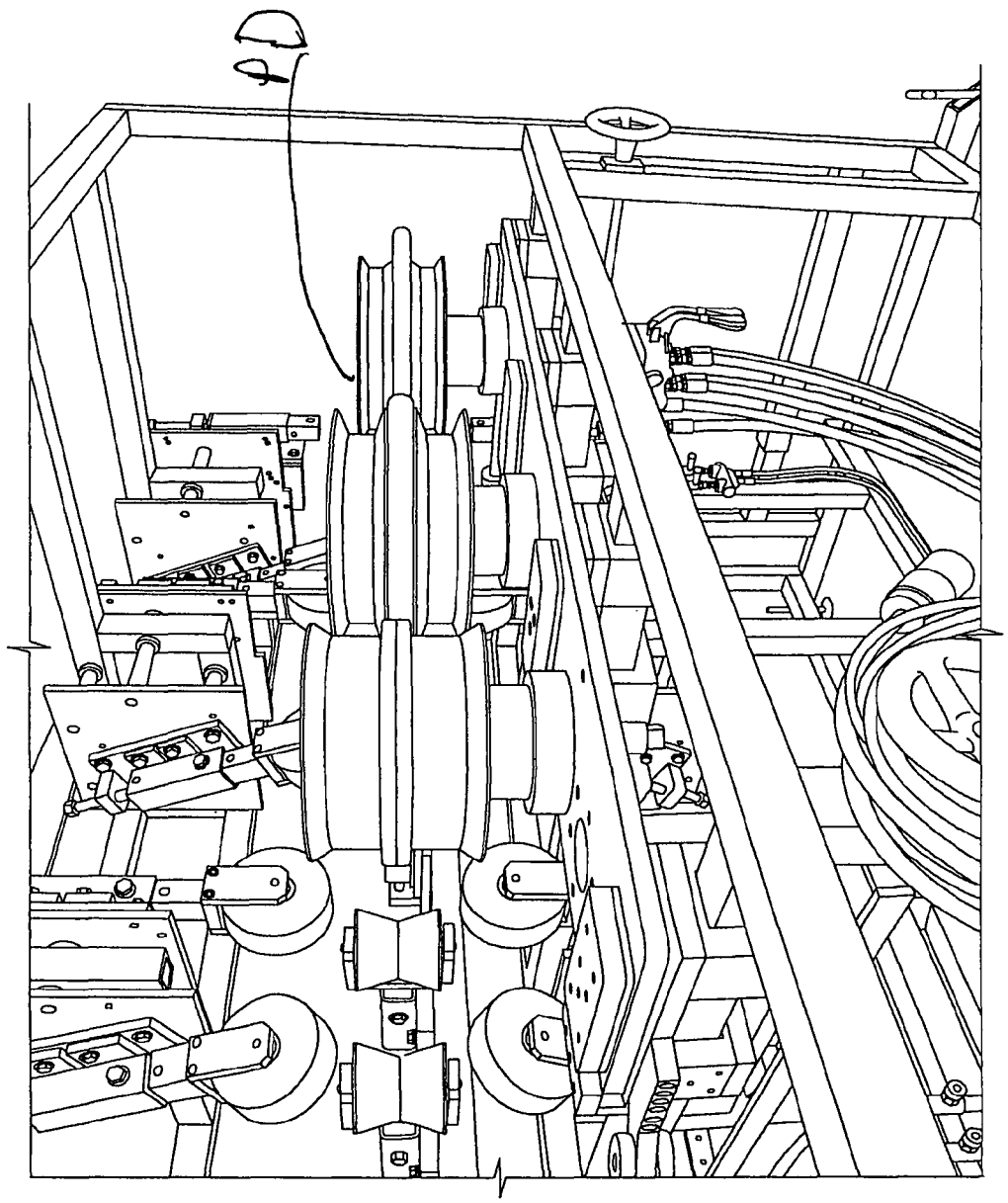
FIG. 7 is a perspective view of a step in a method according to the present invention using the system of FIG. 1.
Figure 8:
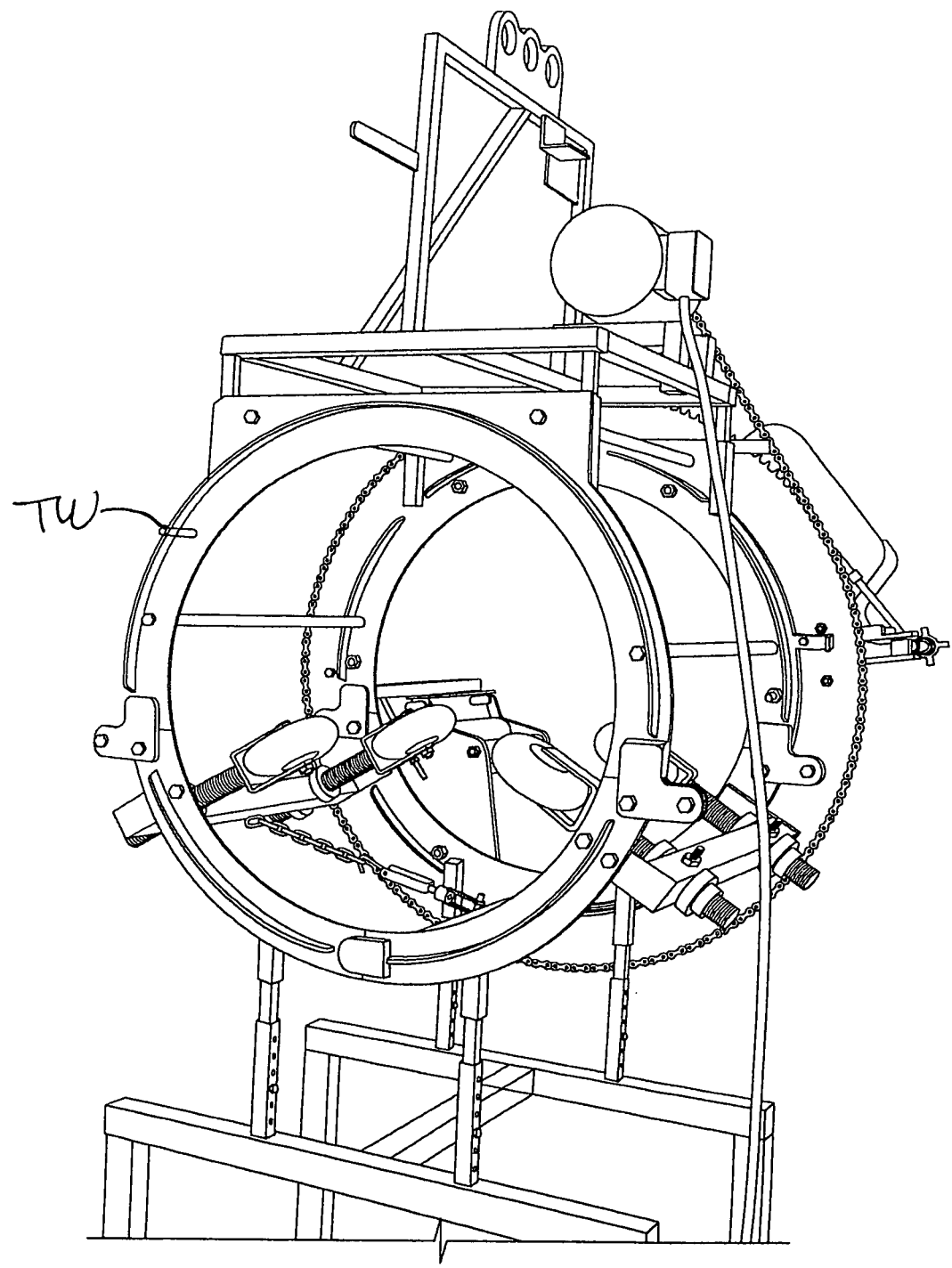
FIG. 8 is a perspective view of a step in a method according to the present invention using the system of FIG. 1.

In step 8 in the manufacturing process, so that the new core pipe will fit in the host pipe, the core pipe is deformed, e.g. with a pipe deformer PD as in FIG. 7. It is within the scope of the present invention to deform the core pipe in any way and into any shape to facilitate insertion into a host pipe. In one aspect, the core pipe is deformed into a "C" shape (see, e.g., FIG. 10) to temporarily reduce its diameter, e.g. between twenty to fifty percent and, in one particular aspect, by approximately forty percent. The pipe deformer PD conveys a force on the pipe CP adequate to change its shape, but not so much as to permanently deform it or damage it. The pipe CP moves through this deformation process at any acceptable speed; and, in one aspect, at a rate of 4 ft/min, which provides up to 1 mile of pipe daily. This step is directly related to the speed of the overall manufacturing system. The deformation of the core pipe CP is eventually reversed after installation as described below.

In step 9 (FIG. 8), following deformation, the pipe CP is quickly wrapped by a tape wrapping machine TW with tape, e.g. Mylar tape MT (see, e.g. FIGS. 9, 10) which, in one aspect is a 2-mm thick polyester film commercially available from DuPont Teijin Films (Hopewell, Va.). The Mylar tape MT holds the "C" shaped deformed core pipe CP in its deformed configuration (see FIG. 10) in place during core pipe CP installation in a host pipe.

In step 10, before the core pipe CP enters the host pipe, a casing CG (see FIG. 9) of thin sleeve of HDPE film is wrapped around the core pipe CP. In one aspect, this casing CG has an HDPE carrier and a partially cured butyl rubber adhesive. It protects the core pipe CP during installation in the host pipe. In one aspect this sleeve material is commercially available material from Tek-Rap Inc. (Houston, Tex.).

Completed core pipe CP coming off the end of the assembly line is ready to enter a host pipe at the site of the manufacture of the core pipe and to be pulled by a pipe puller into a host pipe (or to be delivered to a work site away from the manufacturing site). Before insertion, a 20-foot section of standard HDPE pipe is pulled through a length of host pipe to verify that there are no impassable obstacles and to make sure that the new core pipe can negotiate all turns or other changes in direction within the host pipe. Bends, including 90 degree bends, can be made so long as the bend radius is not too sharp.

In certain aspects, in systems and methods according to the present invention, the system matches the speed of a pipe puller with the speed of the assembly line, accounting along the way for host pipe friction and overall tension along the length of the new core pipe. The resulting coordination among assembly line, pipe and puller is accomplished by computer(s) of the control system with computer readable media programmed with appropriate software for effecting the steps of the methods.

In one aspect, an insertion process according to the present invention begins at a terminus of the host pipe. Here, a 12×12 PLASMA (TRADEMARK) rope is attached to a pipeline pig, which is blown via air or water through the host pipe toward an initial pipe insertion entry point where the new pipe will begin. In one aspect, once delivered, the rope is woven via the long-splice method (common in fishing) to the fiber tapes on the end of the new core pipe. Pulling then begins.

At the terminus of the host pipe, a suitable spool, pulling winch, take-up winch, and trailer are used, e.g. a 35-feet-wide spool traversing on a 60-foot trailer, that winds and pulls the rope, dragging behind it the new core pipe. In one aspect a traction pulling winch that pulls the rope is rated to pull up to 500,000 lb; and the take-up winch is rated to pull up to 35,000 lb. Both of these winches are computer controlled with the control system and their speed is modulated to match production line speed. In certain aspects, a system according to the present invention can pull a total pipe weight of up to 300,000 lb, which is more than adequate to meet the needs of many applications.

Once the end of the new core pipe reaches the end of the host pipe, pulling and production are stopped. Excess pipe is cut to length and, after a couple hours of rest, the new core pipe is sealed off while pressurized air (10-15 psi) is introduced. This pressure reforms the new pipe from its deformed "C" shape to full round again, overcoming resistance from the Mylar wrap in the process. Following this, optionally, while the core pipe is still sealed, is a full hydrostatic test at operational pressure is done to verify pipe integrity and to test fiber optic function.

After all tests are complete and the new pipe is deemed functional, the core pipe ends are unsealed and connected to the host pipe and the relined section is ready to reconnect to a larger system so full pipeline operations can be resumed.

In one actual installation at a chemical production facility in the Northeast U.S. a system according to the present invention was used to replace a 60-year-old, 700-foot section of 12-inch-diameter hot water piping that had been corroded over the years by high heat and water impurities.

The installation was done over a period of two-and-a-half 12-hour days, with the actual pulling of core pipe consuming just 3 hours. In order to manufacture the core pipe, a tent was used that was 500 feet long, 25 feet wide, and 15 feet tall. The core pipe on this project was delivered to the work site ready to install, having been manufactured already at another facility a relatively short distance away. The new core pipe was easily transported to the work site via truck. In certain aspects, up to 2,000 feet of continuous HDPE with a diameter of 6 inches can be transported by truck to a construction site.

The renewed pipeline passed required tests and functions.

In certain aspects, manufacturing and installation of new core pipe liners according to the present invention provides: an extended serviceable life of 40 to 50 years, depending on application and environment; a Hazen-Williams coefficient (water friction loss) of 75-80, compared to 150 for corroded steel (pipe, which means that the new piping, even though smaller in diameter due to the insertion of the core pipe, can move water more efficiently than the host pipe; new piping is compliant with API 15S "Qualification of Spoolable Composite Pipe"; new piping meets U.S. Dept. of Transportation (DOT) requirements for Class 3 and Class 4 lines (close proximity to humans); complete restoration of full pressure or nearly full pressure and service ratings; cost is about significantly less than the cost of total pipeline replacement, e.g., in certain aspect, 50 percent of that required to fully dig up and replace pipeline using traditional methods in a DOT class three or four area.

The present invention, therefore, provides in some, but not necessarily all embodiments, a liner or core pipe which is suitable for insertion into a host pipe, the core pipe having: a pipe made of temperature-resistant corrosion-resistant material, the pipe having an outer surface, an inner surface, a first end and a second end and a flow channel therethrough from the first end to the second end; a first strengthening wrap around the pipe; an optional second strengthening wrap around the pipe; a plurality of spaced-apart pulling tapes positioned longitudinally on the pipe; the pipe deformable to facilitate insertion into a host pipe; and a protective outer wrap on the pipe for protection during insertion into the host pipe. Such a liner or core pipe may have one or some, in any possible combination, of the following: a plurality of fiber optic sensors on the pipe; wherein the sensors provide signals indicative of one of tension applied to the pipe, leaks of the pipe, movement of the pipe, and temperature along the pipe; a third wrap to secure the pulling tapes and sensors in place; a fourth wrap to secure the pulling tapes and sensors in place; wherein the pipe is made of HDPE; wherein the first strengthening wrap and the second strengthening wrap are made of high strength fabric material; wherein the pulling tapes are carbon fiber tapes; wherein the pipe is deformable into a "C" shape; wherein the protective outer wrap is a sleeve of HDPE film; wherein the third wrap comprises a plurality of glass fiber tows; wherein the fourth wrap comprises a plurality of glass fiber tows; wherein the core pipe ranges in length up to 10 miles; wherein the core pipe is made inside a protective structure, e.g., but not limited to a tent or other portable structure; wherein the protective structure is 500 feet long; and/or the core pipe having a Hazen-Williams coefficient of between 75 and 80. The present invention also provides methods for making a core pipe or liner; and methods for inserting a core pipe or liner into a host pipe.

In conclusion, it is seen that the present invention and the embodiments disclosed herein and those covered by the appended claims are well adapted to carry out the objectives and obtain the ends set forth. Certain changes can be made in the subject matter without departing from the spirit and the scope of the invention. Changes are possible within the scope of this invention. Each element or step recited in any of the claims is understood as referring to the step literally and/or to all equivalent elements or steps. The claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112. The inventors may rely on the Doctrine of Equivalents to determine the scope of the invention and of the claims that follow as they may pertain to things not materially departing from, but outside of, the literal scope of the invention as set forth in the following claims. All patents and applications identified herein are incorporated fully herein for all purposes. It is the express intention of the applicant not to invoke 35 U.S.C. § 112, paragraph 6 for any limitations of any of the claims herein, except for those in which the claim expressly uses the words 'means for' together with an associated function. The word "comprising," used in its non-limiting sense, means that items following the word are included, but items not specifically mentioned are not excluded. A reference to an element by the indefinite article "a" does not exclude the possibility that more than one of the element is present, unless the context clearly requires that there be one and only one of the elements.

What is claimed is:

1. A core pipe which is suitable for insertion into a host pipe to replace the host pipe, with no application of energy to the core pipe before or after insertion into the host pipe, the core pipe comprising a new pipe made of temperature-resistant corrosion-resistant material, the pipe having an outer surface, an inner surface, a first end and a second end and a flow channel therethrough from the first end to the second end, the new pipe comprising a plurality of individual pipe sections connected together, a first strengthening wrap around the new pipe, a second strengthening wrap around the new pipe, a plurality of spaced-apart pulling tapes positioned longitudinally on the new pipe, the new pipe configurable to facilitate insertion into a host pipe, the new pipe having a wall thickness of between about 4 mm and 7 mm, a protective outer wrap on the new pipe for protection during insertion into the host pipe, the new pipe comprising a stand-alone replacement for a host pipe for use within the host pipe.

2. The core pipe of claim 1 wherein the plurality of individual pipe sections are welded together.

3. The core pipe of claim 1 wherein the plurality of individual pipe sections are butt fusion welded together end-to-end using a fusion welding machine.

4. The core pipe of claim 1 further comprising
a plurality of fiber optic sensors on the new pipe which provide signals indicative of one of tension applied to the new pipe, leaks of the new pipe, movement of the new pipe, and temperature along the new pipe.

5. The core pipe of claim 4 further comprising
a third wrap to secure the pulling tapes and sensors in place, and
a fourth wrap to secure the pulling tapes and sensors in place.

6. The core pipe of claim 5 wherein the third wrap comprises a plurality of high strength fiber tows and the fourth wrap comprises a plurality of high strength fiber tows.

7. The core pipe of claim 1, the new pipe made of HDPE.

8. The core pipe of claim 1 wherein the first strengthening wrap and the second strengthening wrap are made of high strength fabric material.

9. The core pipe of claim 1 wherein the pulling tapes are carbon fiber tapes.

10. The core pipe of claim 1 wherein the new pipe is configurable into a "C" shape.

11. The core pipe of claim 1 wherein the protective outer wrap is a sleeve of HDPE film.

12. The core pipe of claim 1 wherein the core pipe ranges in length between a few hundred feet up to 10 miles.

13. The core pipe of claim 1 wherein the core pipe ranges in length between about 2 miles to 2.5 miles.

14. The core pipe of claim 1 wherein the core pipe is made inside a protective structure.

15. The core pipe of claim 1 in which the core pipe has a Hazen-Williams coefficient of between 75 and 80.

16. A core pipe which is suitable for insertion into a host pipe to replace the host pipe, with no application of energy to the core pipe before or after insertion, the core pipe comprising a new pipe made of temperature-resistant corrosion-resistant material, the new pipe having an outer surface, an inner surface, a first end and a second end and a flow channel therethrough from the first end to the second end, the new pipe comprising a plurality of individual pipe sections connected together, a first strengthening wrap around the new pipe, a second strengthening wrap around the new pipe, a plurality of spaced-apart pulling tapes positioned longitudinally on the new pipe, the new pipe configurable to facilitate insertion into a host pipe, the new pipe having a wall thickness of between about 4 mm and 7 mm, a protective outer wrap on the new pipe for protection during insertion into the host pipe, a plurality of fiber optic sensors on the new pipe, wherein the sensors provide signals indicative of one of tension applied to the new pipe, leaks of the new pipe, movement of the new pipe, and temperature along the new pipe, a third wrap to secure the pulling tapes and sensors in place, a fourth wrap to secure the pulling tapes and sensors in place, wherein the new pipe is configurable into a "C" shape, wherein the core pipe ranges in length up to 10 miles, and wherein the core pipe is made inside a protective structure, the new pipe comprising a stand-alone replacement for a host pipe for use within the host pipe.

17. The core pipe of claim 16 wherein the plurality of individual pipe sections are welded together.

18. The core pipe of claim 16 wherein the plurality of individual pipe sections are butt fusion welded together end-to-end using a fusion welding machine.

19. A method for making a core pipe suitable for insertion into a host pipe to replace the host pipe, without the application of energy to the core pipe before or after insertion, the method comprising welding together a plurality of sections of pipe to form a new pipe, the pieces made of temperature-resistant corrosion-resistant material, the new pipe having an outer surface, an inner surface, a first end and a second end and a flow channel therethrough from the first end to the second end, wrapping the new pipe with a first strengthening wrap, wrapping the new pipe with a second strengthening wrap, securing a plurality of pulling tapes on the new pipe, configuring the new pipe to facilitate insertion thereof into a host pipe, wrapping the new pipe following deforming with a plurality of tapes to maintain the new pipe in a reformed shape during insertion into a host pipe, and wrapping the new pipe with a protective outer wrap to protect the pipe during installation in a host pipe, the new pipe having a wall thickness of between about 4 mm and 7 mm, the new pipe comprising a stand-alone replacement for a host pipe for use within the host pipe.

20. The method of claim 19 wherein the plurality of individual pipe sections are butt fusion welded together end-to-end using a fusion welding machine.

21. The method of claim 19 further comprising
applying a plurality of sensors to the new pipe before deforming the pipe.

22. The method of claim 19 further comprising
after securing the pulling tapes to the new pipe, wrapping the new pipe with a third wrap and a fourth wrap to secure the pulling tapes in place.

23. The method of claim 19 wherein the core pipe ranges in length between a few hundred feet up to 10 miles.

24. The method of claim 19
wherein the new pipe is made of HDPE,
wherein the first strengthening wrap and the second strengthening wrap are made of high strength fabric material,
wherein the pulling tapes are carbon fiber tapes,
wherein the protective outer wrap is a sleeve of HDPE film,
wherein the third wrap comprises a plurality of high strength fiber tows, and
wherein the fourth wrap comprises a plurality of high strength fiber tows.

25. The method of claim 19 wherein a plurality of fiber optic sensors on the new pipe provide signals indicative of one of tension applied to the new pipe, leaks of the new pipe, movement of the new pipe, and temperature along the new pipe, the method including
with a control system, monitoring tension on the new pipe as the core pipe is made.

26. A method for pulling a core pipe into a host pipe, the method comprising
inserting a pulling rope through a host pipe so that the pulling rope extends through the host pipe,
connecting the pulling rope to pulling tapes of a core pipe, the core pipe comprising a new pipe made of temperature-resistant corrosion-resistant material, the new pipe having an outer surface, an inner surface, a first end and a second end and a flow channel therethrough from the first end to the second end, a first strengthening wrap around the new pipe, a second strengthening wrap around the new pipe, a plurality of spaced-apart pulling tapes positioned longitudinally on the new pipe, the new pipe reformable to facilitate insertion into a damaged host pipe, and a protective outer wrap on the new pipe for protection during insertion into the host pipe, the new pipe having a wall thickness of between about 4 mm and 7 mm, the new pipe comprising a plurality of individual pipe sections connected together and comprising a stand-alone replacement for the host pipe,
pulling the pulling rope with pulling apparatus to pull the core pipe into the host pipe until an end of the core pipe reaches an end of the host pipe and core pipe is along the entire length of the host pipe,
without applying energy to the core pipe before or after insertion of the core pipe into the host pipe.

27. The method of claim 26 wherein the plurality of individual pipe sections are welded together.

28. The method of claim 26 wherein the plurality of individual pipe sections are butt fusion welded together end-to-end using a fusion welding machine.

29. The method of claim 26 further comprising
sealing the ends of the core pipe, and
introducing pressurized air into the sealed core pipe to return the core pipe to a pre-reformed shape.

30. The method of claim 29 further comprising
testing the core pipe while sealed at operational pressure to verify integrity of the core pipe.

31. The method of claim 26 further comprising
with a plurality of fiber optic sensors on the new pipe, controlling with a control system pulling of the core pipe in response to signals indicative of tension thereon during pulling.

32. The method of claim 26
wherein the new pipe is made of HDPE,
wherein the first strengthening wrap and the second strengthening wrap are made of high strength fabric material,
wherein the pulling tapes are carbon fiber tapes,
wherein the protective outer wrap is a sleeve of HDPE film,
wherein the third wrap comprises a plurality of high strength fiber tows, and
wherein the forth wrap comprises a plurality of high strength fiber tows.

* * * * *